M. D. PHELAN.
LASTING MACHINE.
APPLICATION FILED JULY 5, 1906. RENEWED NOV. 22, 1909.

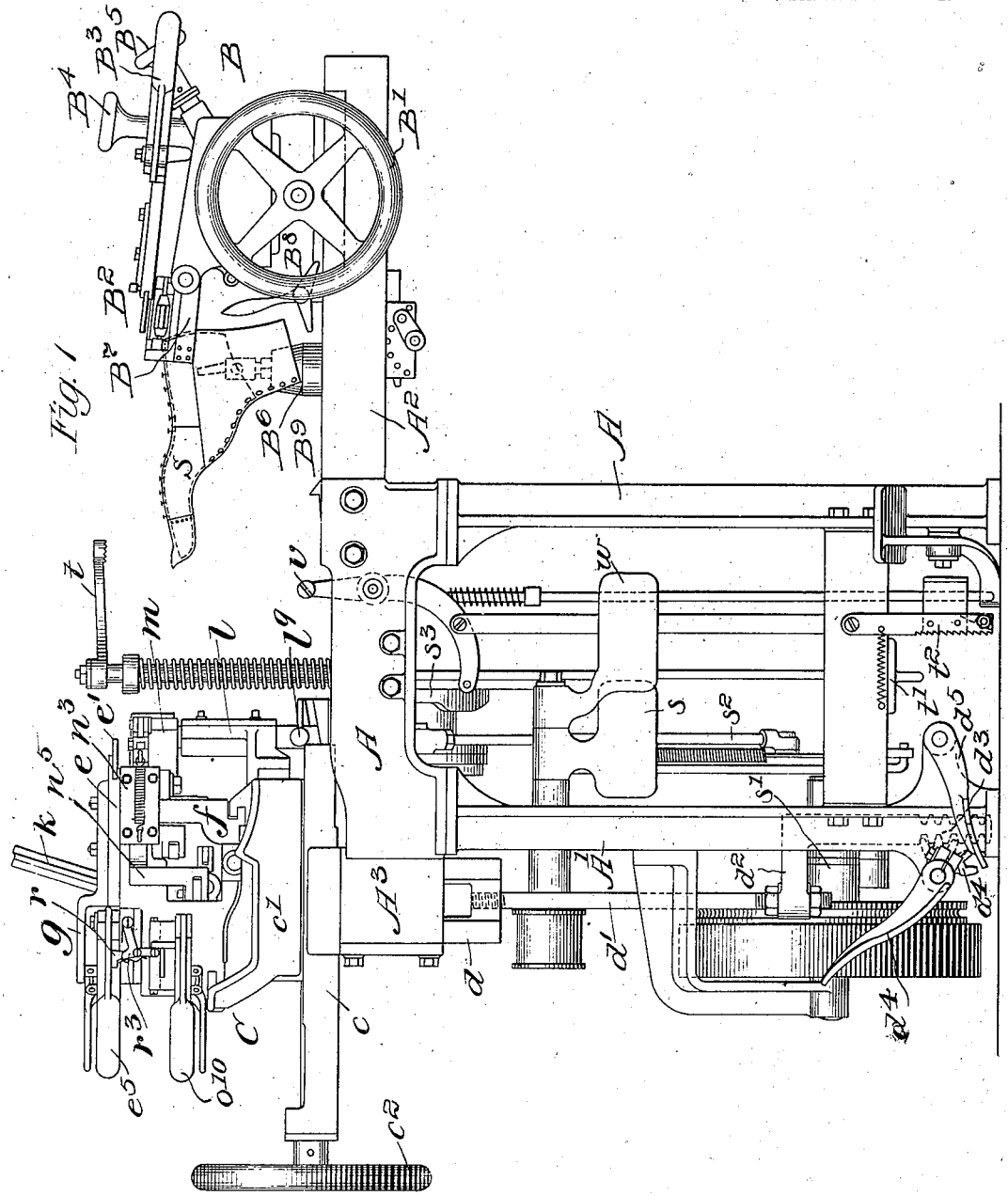

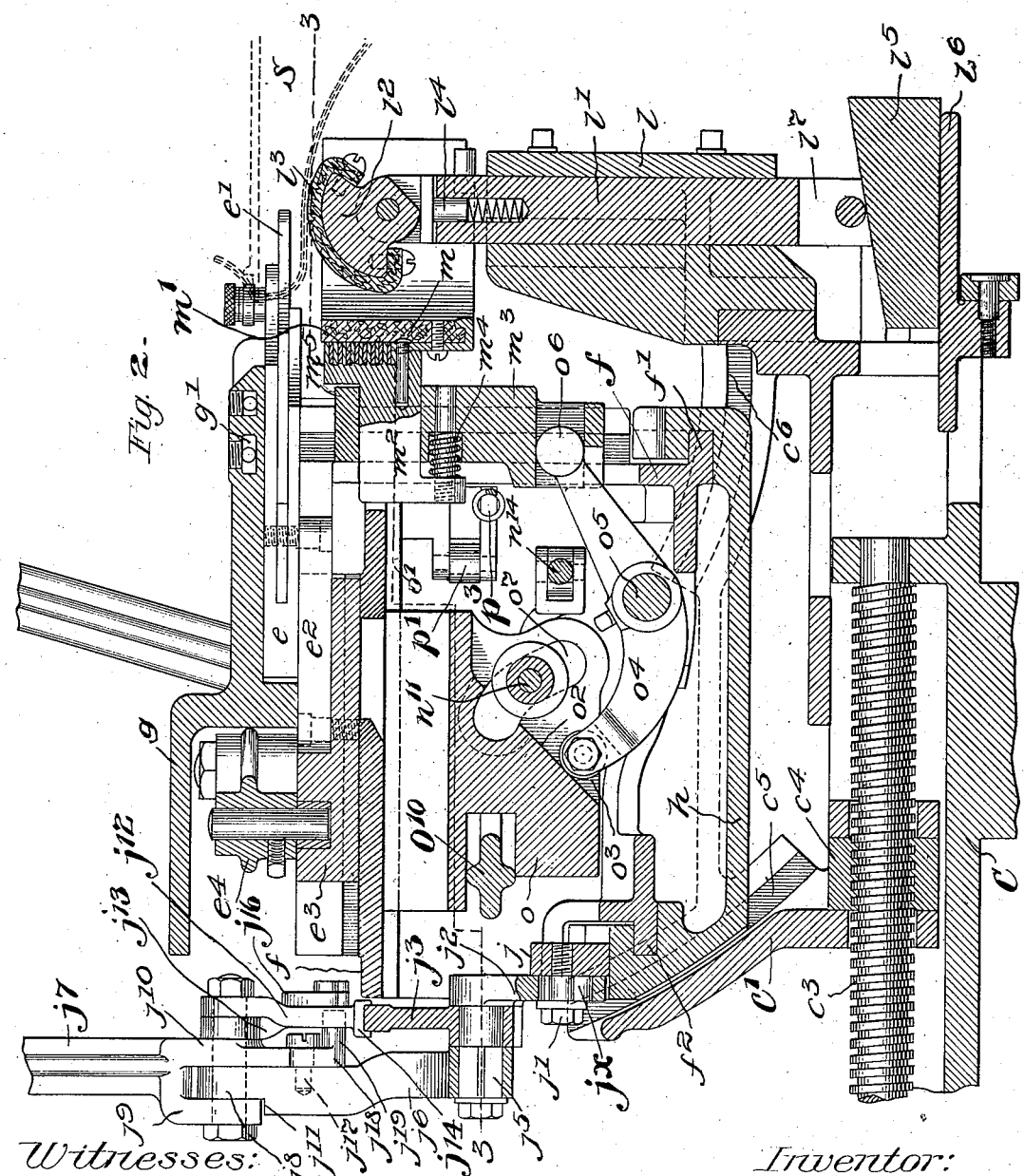

1,124,946.

Patented Jan. 12, 1915.
7 SHEETS—SHEET 3.

Witnesses:
Horace K. Crossman
Adolph C. Kaiser

Inventor:
Merton D. Phelan.
by Emery Booth
Attys.

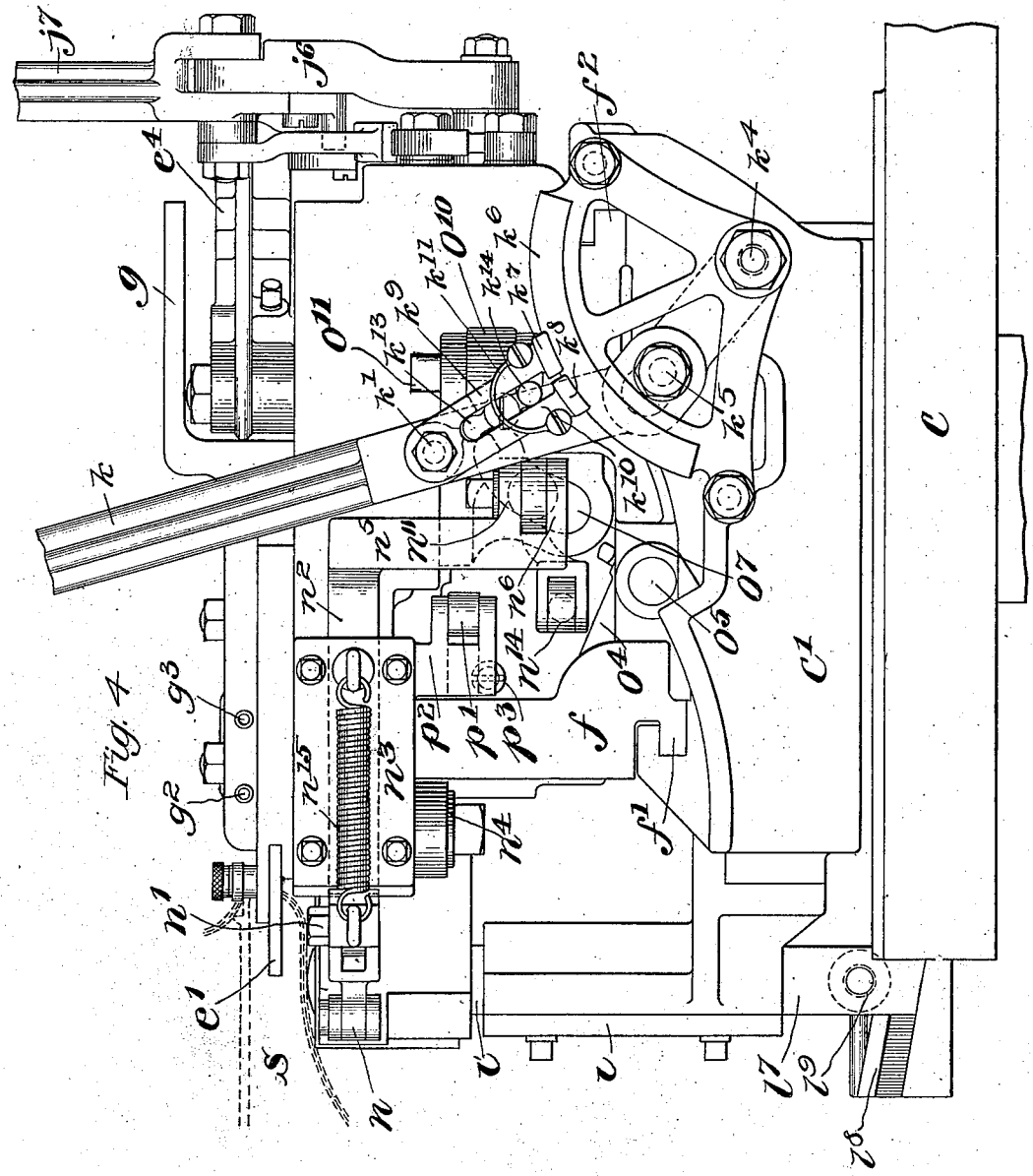

M. D. PHELAN.
LASTING MACHINE.
APPLICATION FILED JULY 5, 1906. RENEWED NOV. 22, 1909.

1,124,946.

Patented Jan. 12, 1915.
7 SHEETS—SHEET 5.

Witnesses:
Horace A. Croseman
Adolph C. Kaiser

Inventor.
Merton D. Phelan.
by Emery & Booth
Attorneys

M. D. PHELAN.
LASTING MACHINE.
APPLICATION FILED JULY 5, 1906. RENEWED NOV. 22, 1909.
1,124,946.
Patented Jan. 12, 1915.
7 SHEETS—SHEET 6.
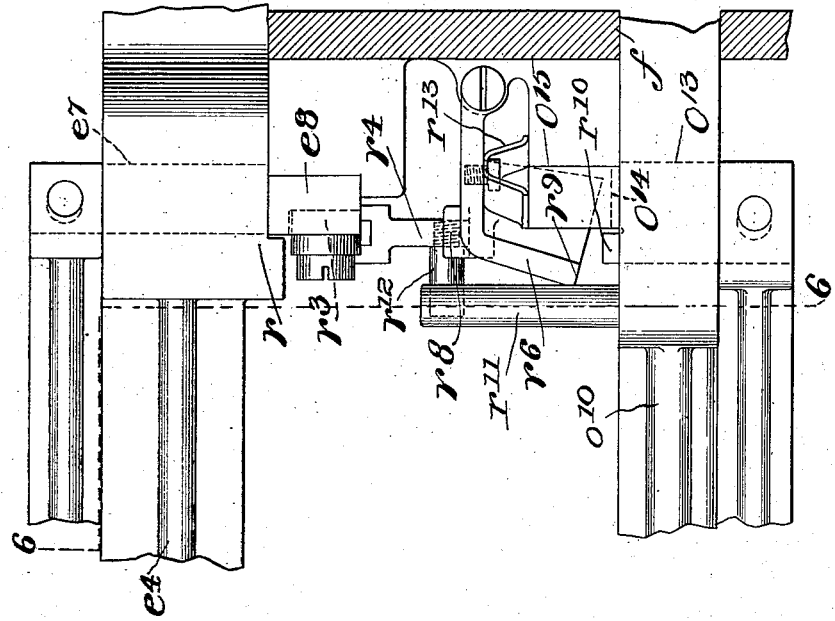
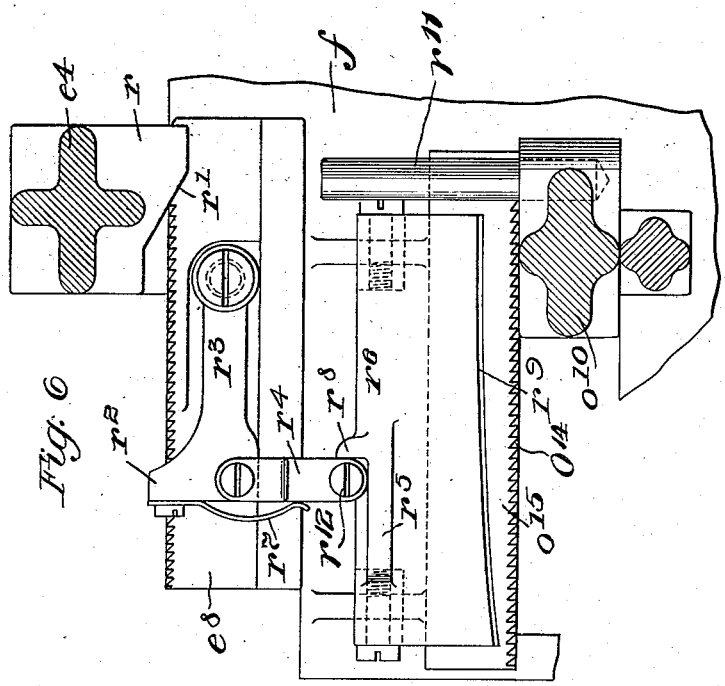
Witnesses:
Horace N. Crossman
Adolph C. Kaiser
Inventor:
Merton D. Phelan
by Emery Booth
Attys.

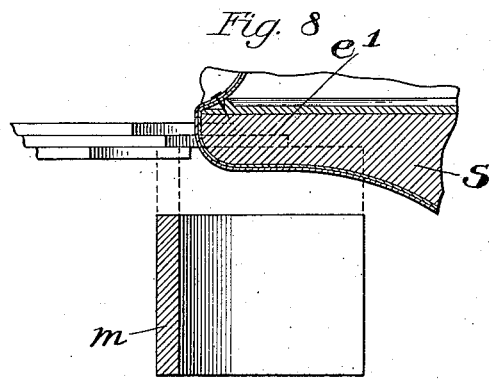
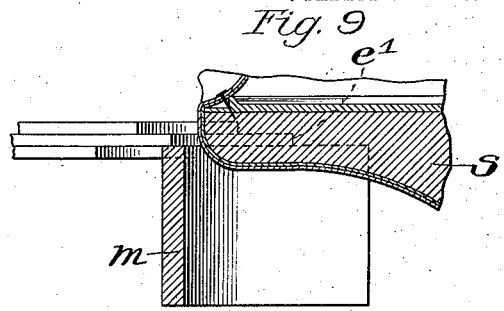
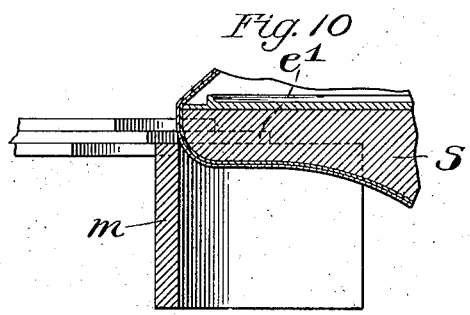
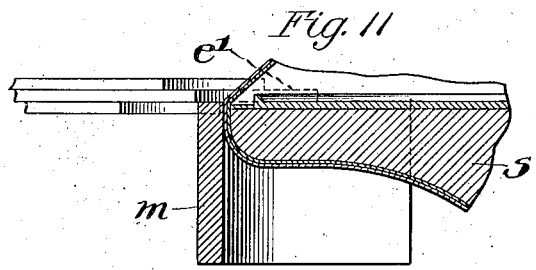
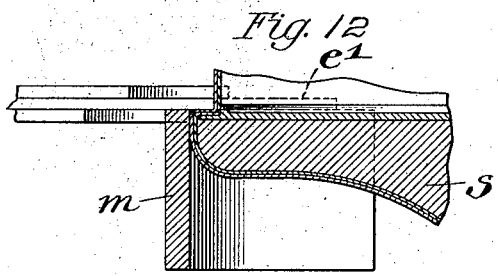
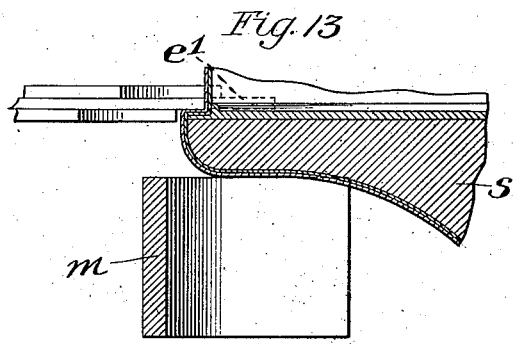

UNITED STATES PATENT OFFICE.

MERTON D. PHELAN, OF BOSTON, MASSACHUSETTS, ASSIGNOR, BY MESNE ASSIGN-MENTS, TO UNITED SHOE MACHINERY COMPANY, OF PATERSON, NEW JERSEY, A CORPORATION OF NEW JERSEY.

LASTING-MACHINE.

1,124,946.　　　　Specification of Letters Patent.　　Patented Jan. 12, 1915.

Application filed July 5, 1906, Serial No. 324,728. Renewed November 22, 1909. Serial No. 529,313.

*To all whom it may concern:*

Be it known that I, MERTON D. PHELAN, a citizen of the United States, residing at Boston, in the county of Suffolk, State of Massachusetts, have invented an Improvement in Lasting-Machines, of which the following description, in connection with the accompanying drawings, is a specification, like letters on the drawings representing like parts.

My invention relates to lasting machines and will be best understood by reference to the following description when taken in connection with the accompanying illustration of one specific embodiment thereof, while its scope will be more particularly pointed out in the appended claims.

Figure 5:
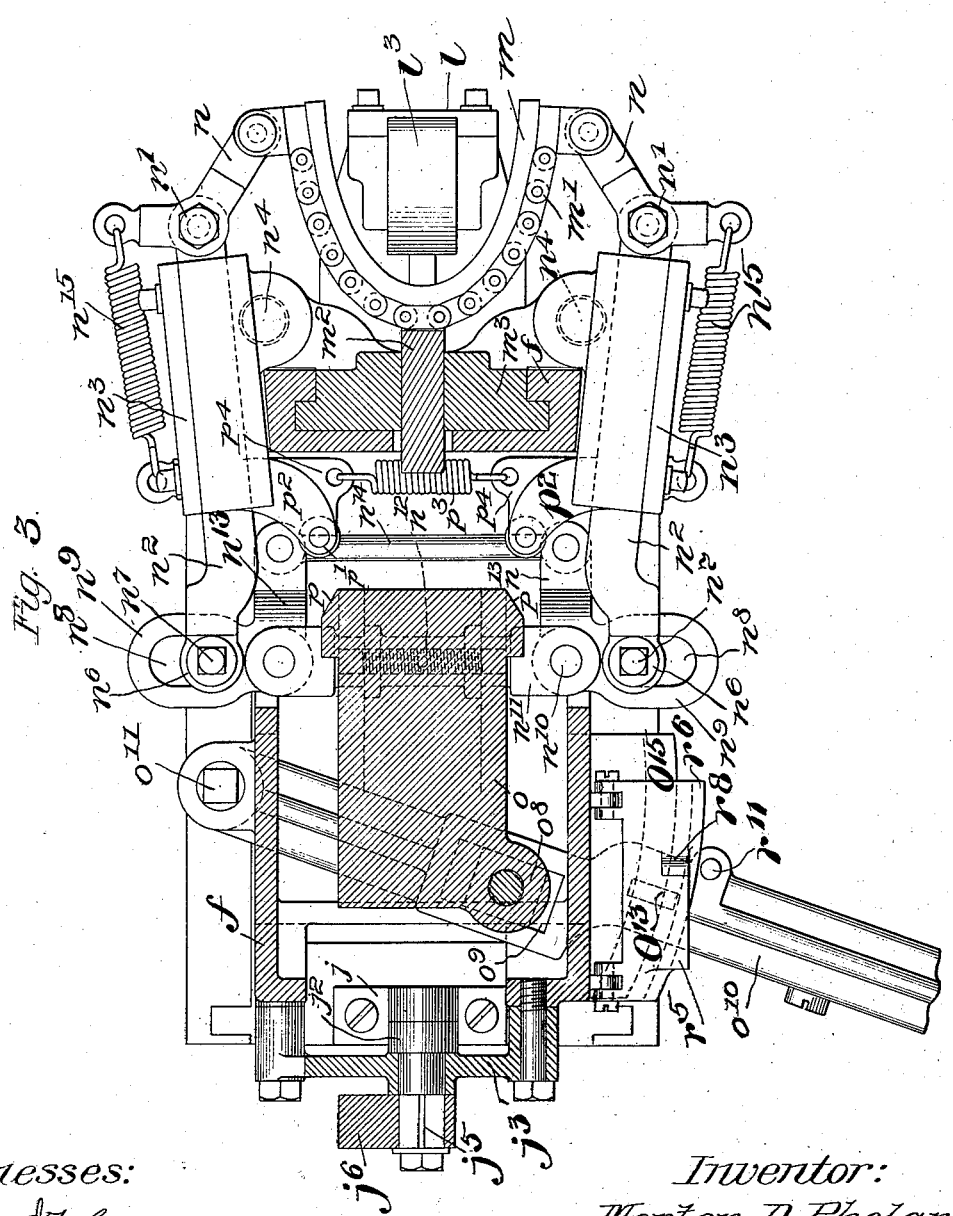
Figure 5:
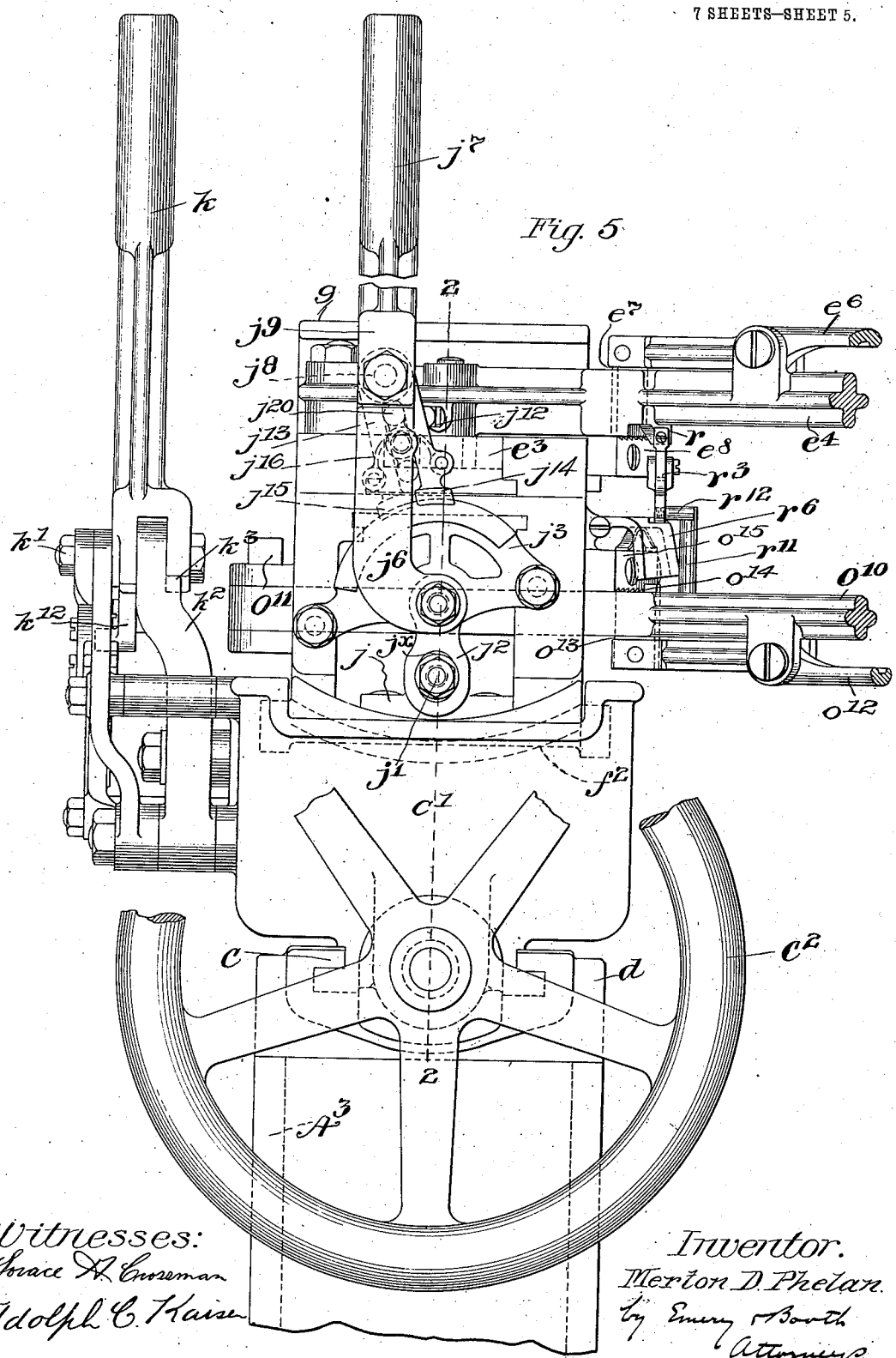

In the drawings: Figure 1 is a side elevation of a lasting machine embodying one form of my invention; Fig. 2 is a central longitudinal section on line 2—2, Fig. 5 showing the principal operating parts on the toe lasting head; Fig. 3 is a horizontal section plan on the line 3—3, in Fig. 2; Fig. 4 is a side elevation of the toe head looking from the rear side of the machine or that opposite to the one at which the operator customarily stands; Fig. 5 is an end elevation of the toe lasting head; Fig. 6 is a side elevation, partly broken away on line 6—6 of Fig. 7, showing a releasing attachment for the toe pad operating mechanism; Fig. 7 is an end view, partly in section, showing the same mechanism, and Figs. 8 to 13 inclusive are views showing the relation of the toe pad to the shoe undergoing lasting, in various stages of the lasting operation.

Referring to the drawings, and to the particular embodiment of my invention there shown, the main frame A is suitably supported and formed to provide a bed for the oppositely disposed heel and toe carriages or heads represented generally at B and C respectively.

The frame is supported upon suitable legs or standards A' and is provided at one end with an overhanging extended guiding support A², upon which the heel carriage B is suitably mounted for longitudinal sliding movement. The latter is provided with the hand wheel B'; by which it may be moved toward or from the lasting head and is provided also with suitable heel wiping plates B², adapted to be advanced or retracted for the heel lasting operation by the heel wiping lever B³. The wiper plates are laterally adjustable about a longitudinal axis to suit the varying angles of different lasts by connections controlled through the hand wheel B⁴, and are longitudinally adjustable about a transverse axis by connections controlled through the hand wheel B⁵.

The heel carriage is also provided with a jack post, B⁶, upon which the shoe to be lasted is placed and by which it is elevated and retracted into engagement with the heel band B⁷ when the hand wheel B' is pulled over to advance the heel carriage toward the center of the machine bed. The carriage having been moved to the left, as viewed in Fig. 1, against the tension of suitable retracting means, it is there locked in position by engagement of the pivoted latch B⁸, with the stationary catch B⁹, the latter being upon the frame of the machine.

The foregoing movements being broadly old and well-known in lasting machines of this type and the specific constructional details of the mechanisms effecting them forming no essential part of my invention herein, the same are not illustrated in detail but may be effected by any well-known or other suitable mechanisms.

The shoe having been jacked and clamped by the heel band of the heel carriage, which latter then occupies a position to the left of that shown in Fig. 1, the toe of the shoe rests inverted upon a suitable toe support as represented in Fig. 2, the shoe being then ready for the action of the lasting devices, of which those for effecting the toe lasting will now be more specifically described.

Referring first more particularly to the toe head, the same comprises a horizontally fixed but vertically movable rest $c$ (Figs. 1, 2, 4 and 5), said rest having formed thereon suitable guide ways lengthwise the machine, along which is slidably mounted the appropriately formed base $c'$ of the toe carriage. The said base is longitudinally adjustable by means of the hand wheel $c^2$, secured to the adjusting screw $c^3$, which latter is held against longitudinal movement but has threaded engagement with the carriage nut $c^4$ (see Fig. 2) so that the operator can adjustably advance the carriage to or from the work.

The rest $c$, which supports the carriage base and the wiper parts, is vertically adjustable to permit vertical movement at any time during the lasting operation of the toe head and the supported lasting appliances relatively to the toe of the jacked shoe. For this purpose, the rest is secured to a vertically sliding head or carriage $d$, which is guided for vertical movement in suitable ways $A^3$ formed upon or secured to the end of the bed frame. The lower end of the carrier is attached to the vertical actuating rod $d'$, and the latter at its lower end is secured to the reciprocatory frame $d^2$, which is slidably guided in the frame of the machine for vertical movement. The frame has formed at its lower end the double faced rack $d^3$, the opposite faces of which mesh with toothed segments attached respectively to the foot treadles $d^4$ and $d^5$. The connection of the foot treadle $d^4$ is such that downward pressure thereon tends to move the segment and raise the rack, thus lifting the toe carriage through the actuating rod $d'$. Ordinarily the weight of the toe head and its attached parts is sufficient to cause suitable depression of the lasting appliances but if it is desired to exert additional pressure the foot treadle $d^5$ may be availed of to effect the result, the said foot treadle being connected to cause a lowering of the head.

Both the heel and the toe carriages are provided with wiping devices which may be of any suitable construction but which, as herein shown with respect to the toe carriage comprise pairs of wiper plates $e$ (Fig. 2) to which are removably secured appropriately shaped wipers or wiper jaws $e'$. Each plate is provided with a cam and roll connection (not shown) so that the wipers are caused to undergo the usual combined swinging and sliding movement for effecting the wiping of the leather over the inner sole of the shoe, the latter being represented in Figs. 1, 2 and 4 by S.

Each wiper is connected for forward movement by an underlying link $e^2$, attached to the sliding guide block $e^3$ which is immediately beneath the link and is mounted for longitudinal movement in guide ways formed in the wiper carrier $f$ which latter supports the wiper plates. The guide block $e^3$ has jointed thereto the toe wiper lever $e^4$, one end of which is fulcrumed upon the wiper carrier, the opposite end carrying the handle grip $e^5$ (Fig. 1). By this handle the operator can move the guide block lengthwise the carrier, causing the wiper jaws to close in toward or open and retract from the toe of the jacked shoe.

The handle grip upon the toe wiper lever has (Fig. 5) the overlying fulcrumed thumb piece $e^6$, which carries at the opposite end a pawl or catch, $e^7$, spring pressed to engage the teeth of the underlying stationary rack $e^8$, so that through engagement of the catch with the rack teeth the wiper plates may be held in any desired position.

The movable parts of the toe head are protected by an overlying plate or shield $g$ (Fig. 2) secured to the wiper carrier. The forward end of the shield, which overlies the wiper plates and contacts therewith during their sliding movement, is provided with an interior steam chamber $g'$, represented in Fig. 2, which chamber has inlet and outlet connections $g^2$ and $g^3$ (Fig. 4) adapted for attachment to a suitable source of live steam, whereby the overlying plate, the underlying wiper plates and the end pad to be described, may be kept at a relatively high temperature, the exact degree of which can be regulated by varying the amount of steam or the pressure of the steam admitted to the heating chamber. By heating the end pad, the leather about the sides of the last at the end portion is rendered soft and pliable in which condition it is more easily worked and made to conform to the shape of the last and by thus maintaining heated the wiper plates and the wiper jaws, and particularly while held in their retracted position, they are advanced for the lasting operation in a highly heated state and in a condition most effective for smoothly laying in and crimping the leather over the toe of the last.

Like the heel wipers, the toe wipers may be rocked or adjusted laterally to different inclinations transversely the last. For this purpose, the lower front and rear walls of the wiper carrier have formed thereon curved segmental bearing portions $f'$ and $f^2$ respectively, which are slidably mounted in correspondingly curved guide ways, formed in the intermediate carriage-body portion $h$. The wiper carrier, therefore, owing to the curvature of the bearing portions of the guide ways, may be tipped about an axis, which herein passes substantially centrally through the plane of action of the wiper jaws.

To control the described lateral tipping adjustment, there is provided suitable operating means as follows. Bolted to the intermediate carriage-body is a bracket $j$ (Figs. 2, 3 and 5) and pivoted upon a stud $j'$ secured to said bracket is the depending end of the crank lever or arm $j^2$. The connection $j'$, $j^2$ should be a loose one, and to this end the arm $j^2$ may be slotted as at $j^x$. The latter is pivotally mounted or journaled in the segmental frame $j^3$, the latter being securely bolted at opposite ends to the outer end walls of the wiper carrier $f$. The crank lever has its journaling pin squared at its outer end at $j^5$ and upon the squared end of this pin is secured the lower end of the substantially upright lever $j^6$. It will be evident that as the lever $j^6$ is rocked about its fixed fulcrum upon the bracket $j$ the wiper carrier will tend to rock laterally upon its curved guide ways. In order readily to effect this lateral movement, the lever $j^6$ is connected to the operating handle $j^7$. The connection however between the handle lever $j^7$ and the operating lever $j^6$ is such that the wiper carrier is effectively locked against tipping movement except when the handle lever $j^7$ is first moved slightly in one direction or the other. For this purpose, the lower end of the handle lever (Figs. 2 and 5) is pivoted to the operating lever at $j^8$, but at the connecting pivot the lever is forked to form the two depending lips $j^9$ and $j^{10}$. The lower end of the lip $j^9$ is squared and overlies by a slight clearance the squared shoulder $j^{11}$, at the upper end of the operating lever, so that there is permitted a slight movement of the handle lever about the pivot $j^8$ before it engages and effects movement of the operating lever $j^6$.

The operating lever is normally locked against movement relatively to the segment $j^3$ by means of locking devices which consists of a pair of fingers $j^{12}$ and $j^{13}$, pivoted at $j^8$, and carrying at their lower ends brake shoes $j^{14}$ and $j^{15}$ respectively, which engage the curved edge of the segmental bracket $j^3$. These fingers are normally drawn toward each other by the connecting spring $j^{16}$ at such an angle and in such relation to the connected parts that the binding action produced thereby effectually prevents any tipping movement of the wipers.

Pivoted at $j^{17}$, upon the operating lever, is a swinging releasing dog $j^{18}$, having at its lower end a lug $j^{19}$, which enters between the said two fingers and at its upper end a lug $j^{20}$, which is engaged by the lower forked end of the depending lip $j^{10}$ on the handle lever. When the handle lever is given its initial movement the releasing dog is moved thereby to force outward and away from engagement with the segment that braking finger which lies in the direction of lever movement, leaving the actuating lever free for movement to rock the wipers as soon as the handle lever engages the squared shoulder thereon. It will be seen, however, that although seizure of the handle lever and attempted movement in either direction immediately unlocks the actuating lever for movement in that direction unless the actuating lever is so unlocked the wiper carrier remains practically fixed with reference to its support and cannot be displaced from its fixed position by any accidental thrust or strain upon the wiper carrying parts.

In addition to the adjustment of the wipers to different lateral inclinations they are also mounted to permit their adaptation to different pitches or inclinations of the last lengthwise of the machine. For this purpose, the toe carriage base is provided with curved segmental guideways $c^5$ and $c^6$ respectively, having a curvature with reference to a common transverse axis, there being provided upon the intermediate carriage body $h$ suitable flanged segmental bearing portions to coöperate therewith. There is here provided a device for controlling the tipping adjustment of the plates about the transverse axis, similar in its general construction to that already described for securing the adjustment about the longitudinal axis.

There is provided a hand lever $k$ (Figs. 4 and 5) pivoted at $k'$ to an operating lever $k^2$ and having a shouldered connection therewith at $k^3$ (Fig. 5) which permits of a slight idle movement of the handle lever before positive engagement with the actuating lever $k^2$. The actuating lever is pivoted to the toe carriage base at $k^4$ but is slightly inclined to engage with a stud $k^5$, secured to the side of the intermediate carriage body there being provided a short slot in the actuating lever to permit the necessary movement of the stud $k^5$ therein when the actuating lever is moved to tip the intermediate carriage body. Secured also to the carriage base is the segmental bracket $k^6$, with the edge of which are engaged the shoes $k^7$ and $k^8$ of the brake fingers $k^9$ and $k^{10}$, the latter being drawn toward each other as before by the spring $k^{11}$. The releasing arm $k^{12}$ is pivoted upon the actuating lever $k^2$ and has the lug $k^{13}$ engaged by the depending end of the hand lever $k$ and the oppositely directed lug $k^{14}$, acting between the locking fingers to move them to a releasing position on movement of the handle lever. Any movement of the handle will first free the lever $k^2$ and then move the same about its fulcrum $k^4$ to cause movement of the stud $k^5$ and tipping movement of the intermediate carriage body.

Referring more particularly to Figs. 2 and 4, the toe carriage base $c'$ is provided near the forepart thereof with the bracket $l$, in which is vertically slidable the toe post $l'$. The latter carries at its upper end the pivotally mounted pad support $l^2$, the curved face of which, preferably centered at the pivot, is covered with leather or other cushioning material $l^3$ and adapted to underlie the toe of the jacked shoe. The rest is normally moved to an upright position by the upward pressure received from the head of a spring pressed pin $l^4$, engaging the flattened lower end of the rest, between the forked ears of the post. After the shoe is jacked the rest is raised in its support and pressed against the underlying leather of the toe. For this purpose, there is provided the sliding rest $l^5$, which is supported loosely upon the flat top of a swinging shelf $l^6$, (Fig. 2) the latter being pivoted to the frame of the machine but adapted to be swung up or down by the action of the cam shaft of the machine to raise and lower the post and its attached rest. The toe post has an adjustment upon the sliding rest, the lower portion thereof being split as at $l^7$ and embracing the inclined tongue $l^8$, (Fig. 4) on which it may be adjustably clamped in any desired position by means of the clamping screw $l^9$.

In machines of this general type the usual operation after the jacking of the shoe and the raising of the toe post, so far as it has related to the toe lasting, has comprehended not only the wiping in of the leather over the inner sole by the wiper jaws, but the previous wiping of the leather against and upon the sides of the toe as well by the foot-controlled elevation of the toe lasting head simultaneously with the hand controlled advance and retraction of the wiper jaws. The wiper jaws, however, are constructed primarily to crease and lay in the leather over the inner sole and are not always, and in fact are seldom, the best means for drawing or stretching the leather up and about the toe preparatory to wiping it in. I have, therefore, in the present instance provided additional lasting means which though possessing in itself features of marked novelty and advantage, may be used with striking effect in combination with and as an adjunct to the wiper jaws to wipe or stretch the leather up and about the toe preparatory to the action of the wiper jaws in breaking the leather down. Such auxiliary means may assume widely different forms, but herein the same comprises a toe wiping band or pad $m$, of any suitable construction or form, but preferably, as herein, of leather or other like frictional material of such dimensions and shape as when suitably moved, to engage the leather at and about the toe of the shoe and while conforming to the shape thereof to wipe the upper up and over the last.

The pad $m$ is carried upon a suitable support, which herein consists of the flexible sprocket chain $m'$, which in turn is secured to the rearward longitudinally sliding pad support $m^2$, slidably mounted in the pad carrier $m^3$. Between the pad carrier and the downturned end of the sliding support is provided the compression spring $m^4$, which normally retracts the pad until a shoulder $m^5$ upon the support engages the carrier, this being substantially the position shown in Fig. 2.

It will be observed that the pad in its normal position, in which it is shown in Fig. 2, is lowered below the level of the toe. The carrier $m^3$, however, is vertically slidable in suitable guide ways (see Fig. 2) in the walls of wiper carrier $f$ and suitable means are provided whereby it may be elevated to engage the pad with the toe.

Obviously, when steam is admitted to the heating chamber as hereinbefore noted, the parts of the lasting head adjacent to the end of the shoe will be subjected to the heating action, and particularly will the wipers, wiper plates, and end pad, all of which parts are in close proximity to the heating chamber, become heated, and serve to soften the leather about the end and at the sides of the last so that it is made more readily conformable to the contour of the last preparatory to fastening the upper.

In the operation of the machine with the wiper jaws retracted, the pad is first raised from its normal position represented in Fig. 8 to the position shown in Fig. 9. The free ends of the pad are then closed in about the sides of the toe so that the pad as a whole firmly clasps and embraces the leather at the toe. Simultaneously the toe head is raised by movement of the foot lever $d^4$, the pad being then elevated to the position shown in Fig. 11, which acts to wipe or stretch the leather upward while conforming at all places to the shape of the last. The pad may then be dropped, the head depressed and the operation repeated any number of times, until the operator is satisfied that the leather has been sufficiently worked up and over the toe, the pad then being left in the position shown in Fig. 12. The wipers are then advanced by movement of the toe wiper lever to close in and break down the upper over the edge of the inner sole represented in Fig. 12, the wipers being manipulated in any usual or suitable manner. The shoe being then ready for toe wiring or tacking, the pad is dropped and withdrawn to its normal position shown in Fig. 13. For the closing in movement of the pad the latter has each free end jointed to one arm of a bell crank lever, $n$ which is pivoted at $n'$ to the slide bar $n^2$, so that the fulcra of the levers $n$ may be advanced and the pad clasped in and about the shoe. The slide bars are each slidably mounted in a bracket $n^3$, which is pivoted at $n^4$ upon lateral lugs upon the pad carrier $m^3$, so that the brackets may be swung inwardly so as to give the bell crank levers an inward as well as a forward movement. For the forward movement of the slide bars $n^2$ the latter have each a depending end $n^5$, (see Fig. 4) provided with a rearwardly forked portion $n^6$, the latter having the stud $n^7$, working in the slot $n^8$ provided in the bell crank lever $n^9$. Each bell crank is jointed at $n^{10}$ to the horizontal transverse connecting member $n^{11}$, which latter is provided with a turnbuckle $n^{12}$, or other suitable adjusting device. Each bell crank lever has a forwardly directed arm $n^{13}$, the two parallel arms being pivoted to the opposite ends of the connecting link $n^{14}$. It will be obvious that forward movement of the connecting member $n^{11}$ will cause forward movement of the slide bars $n^2$, the latter, however, being permitted a swinging movement, when the brackets $n^3$ are moved on their fulcra, through the provision of the slot $n^8$. On account of the differences in the contour of opposite sides of the toe of the last and the desirability of making the pad adaptable to rights and lefts, one side of the pad will at times be required to advance and close in farther than the other and, at other times, not so far. This is permitted by the provision of the bell crank arms $n^{13}$, joined by the connecting link $n^{14}$, which permits the slide bars to move unequally and the two ends of the pad to equalize in its adaptation to the shape of the toe, although the pad as a whole is advanced positively to a clasping position by forward movement of the connection $n^{11}$. For obtaining the opening and closing movements, as well as the elevation and depression of the pad, there is provided a pad actuating block $o$, which is slidably mounted for longitudinal sliding movement upon interior guides $o'$ on the wiper carrier $f$. This block has (Fig. 2) an inclined lower face $o^2$, which engages the cam roll $o^3$, upon the pad lifting lever $o^4$. This lever is fulcrumed at $o^5$ on the wiper carrier and has its opposite or active end $o^6$ in engagement with a slot or aperture in the pad carrier $m^3$, so that the movement of the pad lifting lever about its axis tends to raise or lower the pad carrier with its supported pad. It will be seen that the advance of the pad actuating block $o$ will effect the raising of the pad and the retraction of the said block the lowering of the pad. The actuating block is also provided in each of its side walls with a curved slot $o^7$, through which passes the connecting link $n^{11}$, the shape of the slot and its engagement with the connecting link being such that, as the block is advanced, the connecting link is first lifted, until seated in the upper end of the slot, and then advanced with further movement of the block. The shape of the slot $o^7$ and its relation to the inclined cam face $o^2$ are such that the free ends of the pad, through their several connections to the connecting link $n^{11}$, are elevated proportionately to and with the elevation of the central portion of the pad through its connection to the pad elevating lever $o^4$. For the advance or retraction of the actuating block $o$ the latter is pivoted to a block $o^8$, (Fig. 3) which engages the slot $o^9$ of the pad actuating lever $o^{10}$, the latter being fixedly fulcrumed to the wiper carrier at $o^{11}$. The pad actuating lever is provided with the underlying fulcrumed thumb piece $o^{12}$, carrying at its opposite end the spring pressed pawl or catch $o^{13}$, adapted to engage the teeth $o^{14}$ upon the under side of the stationary ratchet $o^{15}$. By this means the operator may move the pad actuating lever and leave it fixedly positioned in any desired point.

The advance of the actuator block not only elevates the pad and moves forward the slide bars $n^2$ through the connections described but also swings the brackets $n^3$ inwardly about the fulcra $n^4$. For this purpose, the forward end of the actuator block (Fig. 3) is provided with suitably inclined sides $p$, which, on the forward movement of the block, engage each with a cam roll $p'$, sustained upon a lug $p^2$ projecting from the rear of the bracket $n^3$. The two lugs are normally drawn together by means of the tension spring $p^3$, secured to ears $p^4$, upon the said lugs $p^2$, so that the fulcra of the bell crank levers $n$ are normally maintained in their extreme outer position, as shown in Fig. 3, and the pad with its free ends spread open. On advance of the actuator block, however, the cam rolls are engaged by the tapered sides $p$, the rear ends of the brackets are forced apart and the fulcra of the bell crank levers forced inwardly. This swinging movement of the brackets may be timed in any desired way with reference to the forward movement of the slide bars $n^2$, but as herein shown it takes place simultaneously with the advance of the said bars. The contour of the tapered sides $p$ of the actuator block may be varied according to the movement to be imparted to the brackets. The bell crank levers $n$ are normally swung to hold the pad in an open position by means of the tension springs $n^{15}$, each of which is secured at one end to the free end of a bell crank lever and at its opposite end to the bracket $n^3$.

The operation of the toe pad will be obvious. The operator, by advancing or retracting the pad-actuating lever, will simultaneously raise and clasp the pad about the toe or withdraw the same therefrom. In clasping the pad about the toe, he moves it from the position shown in Fig. 8 to that shown in Fig. 10, and, with the pad in full contact all around the toe is enabled to work the leather upwardly by the elevation of the toe head as a whole. He may repeat this operation any number of times desired and then complete the lasting by the independent actuation of the wiper plates. It will thus be seen that he has at his command two independent lasting instrumentalities namely, the pad and the wiper jaws, each of which is constructed to most effectively carry out its intended purpose, and each of which is arranged to permit of independent actuation. It is obvious that, if, for any reason, it is desired, the entire lasting operation may be performed through the agency wholly of the wiper plates and without the use of the pad. After the action of the wiper jaws has been completed, the pad actuating lever may be unlatched and thrown back to drop the pad into the position shown in Fig. 13. This drops the pad out of the way for the toe wiring operation, or for tacking, when the latter method of securing is used. During this movement, the wipers may be left in contact with the leather as represented in Fig. 13, to hold the stretched upper firmly down on the edge of the last.

Under certain circumstances it may be desirable to employ an automatic release for the pad actuating lever so that some such act as the final manipulation of the wiper jaws may effect the retraction and depression of the toe pad. This might be employed upon those grades of leather where the stretched upper, after having been broken down and laid in over the last edge, does not tend to slack under the temporary withdrawal of the wiper jaws. In Figs. 6 and 7 I have illustrated the details of an attachment which effects release of the pad-actuating lever when the wiper lever is thrown to an extreme rear position.

Referring particularly to Figs. 6 and 7, and also to Figs. 1 and 5, the wiper actuating lever $e^4$ is provided with a depending plate $r$, having an inclined edge $r'$, which, on the movement of the lever to its extreme rearward position, engages a projecting lug $r^2$ upon the upper side of the horizontal swinging arm $r^3$, the latter pivoted to the ratchet $e^8$. This arm carries the depending pivoted finger $r^4$, the lower end of which rests upon a horizontal ledge $r^5$ formed on the side of the swinging apron $r^6$, the latter being pivotally mounted on the side walls of the wiper carrier. The finger $r^4$ is normally held by a spring $r^7$ against an upright lug $r^8$ so that it is maintained vertical and any downward movement of the finger causes the apron $r^6$ to be swung downwardly bringing its lower edge $r^9$ upon the upper projecting end $r^{10}$ of the locking pawl $o^{13}$, of the pad actuating lever. This release of the locking pawl, which is caused when the toe wiper lever is swung to engage the upright lug $r^2$, allows the pad actuating lever $o^{10}$ to swing back, permitting the pad to open and drop away from the shoe. The pad actuating lever is provided with the upright pin $r^{11}$ and on the releasing movement of the lever this pin strikes a lateral stud $r^{12}$ on the side of the depending finger $r^4$, knocking the latter off from the ledge $r^5$ and permitting the apron to rise under the influence of the spring $r^{13}$ (Fig. 7) so that the locking pawl again catches the teeth of the ratchet and holds the lever fixed. Where this attachment is used the operator, at the close of the wiping operation, will merely sweep the wiping lever back to its extreme position for the release of the pad, and then immediately advance the wipers again over the leather to perform the toe wiring.

The transverse tipping axis about which the wipers are adjustable is preferably selected at or about the upper edge of the rear central portion of the toe band when the latter is in its elevated or raised position, and immediately beneath the wiper plates. The toe band in its normal retracted position will usually clear the toe of a shoe by a slight clearance, as represented in Figs. 8 and 9, its initial adjustment to this or any other desired position being readily effected by the advance or retraction of the toe head as a whole through the hand wheel $c^2$.

The general operation of the machine in which the toe lasting mechanism described forms a component and coöperating part will be evident from the drawings. The operator having placed the shoe to be lasted upon the heel post, as indicated in Fig. 1, by turning the hand wheel B', the heel of the shoe is retracted into the heel clamp and there elevated against the overlapping edge of the wipers. By the same movement the operator draws the carriage toward the center of the machine where it is locked by the swinging latch B$^8$; in this position the inverted toe of the shoe is over the toe rest and the toe is in close proximity to the toe pad and wiper plates. The operator then presses the knee lever $s$, which is suitably connected, to throw in the clutching mechanism $s'$, the latter having connections $s^2$ to the cam shaft $s^3$, whereby the cam shaft is given a partial rotation, this causes elevation of the toe post and the tightening of the heel band. The hold down $t$ is then swung into position over the shoe and forced down by the foot lever $t'$ where it is held by the ratchet $t^2$. The heel wiper plates having been manipulated for the lasting of the heel portion of the shoe, and the toe wiper plates and toe band having been operated as described for the lasting of the toe portion of the shoe, the upper is fastened by wiring or tacking and the entire mechanism restored to its normal position shown in Fig. 1 by a single pressure upon the knee lever $w$, this acting through a partial rotation of the cam shaft to drop the toe post, and through connection to the swinging arm $v$ to release and return the carriage, unclamp the heel band, drop and throw forward the heel post and release the down hold.

While I have shown and described one particular embodiment of my invention in the foregoing specification for the purpose of illustrating the same, it is to be understood that the invention is not limited to the precise construction or to the details or form or arrangement of parts herein disclosed, but that extensive deviations may be made therefrom without departing from the spirit of this invention. It is also to be understood that while this invention contemplates improvements in various features of a lasting machine, and particularly in the toe lasting device, it also contemplates the employment of any or all of the said features, either jointly or severally, not only in the described type of machines, but in other lasting machines and under other conditions than here shown. It is also within the scope of this invention to make other applications of various constructional features here disclosed, and moreover to apply to the heel lasting head features which are here shown as applied only to the toe lasting head of the machine.

Claims:

1. A lasting machine having wiper plates, means for actuating the same, a pad, means for closing the said pad about one end of the shoe, and for elevating the same relatively thereto, and means for automatically withdrawing said pad from engagement with the shoe.

2. A lasting machine having wiper plates, operating means therefor, a pad adapted to be clasped about one end of the shoe, a lever independent of the wiper operating means for moving the pad into such position, and means controlled by the movement of said operating means for releasing the pad from engagement with the shoe.

3. In a lasting machine, the combination of end lasting means for laying the upper over the last bottom, and means for heating the upper about the sides of the last at the end thereof to render it soft and pliable that the end lasting means may readily conform the upper to the contour of the last about the end thereof preparatory to fastening the upper.

4. In a lasting machine, the combination with wipers and operating means therefor, of an end pad, means to actuate said pad into position for wiping the upper about the last, locking devices for said actuating means, and means controlled by the movement of the wiper operating means for releasing said locking devices.

5. In a lasting machine the combination with the wipers $e$ and the wiper lever $e^4$, of the pad $m$ and the pad lever $o^{10}$, the arm $r^3$ adapted to be engaged by said wiper lever, the finger $r^4$ on said arm, and the apron $r^6$ engaged by said finger and adapted to engage the pad lever.

6. A lasting machine having an end pad $m$, the levers $n$ connected to said pad, the slide rods $n^2$ for actuating said levers, and the pivoted brackets $n^3$ for sustaining said rods.

7. In a lasting machine the combination with a lasting pad, of levers supporting its ends, longitudinally movable supports for the levers, means fulcrumed for lateral movement carrying the said supports, and means for moving said supports relatively to their carrying means.

8. The combination with a vertically movable lasting pad, a carrier therefor, levers supporting the ends of said pad, longitudinally movable supports for the levers and means carrying said supports and fulcrumed for lateral movement on said carrier.

9. The combination with a lasting pad, of pivoted end supports, slide bars normally in retracted position for carrying said end supports, and means for swinging said slide bars toward the center of the pad.

10. The combination with a lasting pad, of pivoted end supports for said pad, supporting means for said end supports mounted for movement toward and from said pad, and means acting independently of and through said supporting means to simultaneously advance said end supports and move them toward or from the pad.

11. A lasting machine having a lasting pad $m$, slide rods $n^2$ connected to said pad, a lever $n^9$ connected to each of said slide rods, and a link $n^{14}$ connecting said levers.

12. The combination with a lasting pad, of longitudinally slidable end supports for said pad, levers attached to the free ends of said supports, an equalizing rod connecting the levers, and a connecting member connecting the fulcra of said levers.

13. The combination with a pad $m$, of pad actuating rods $n^2$, movable brackets $n^3$ sustaining said rods, rolls $p'$ on said brackets, and the wedge $p$ for engaging said rolls.

14. A lasting machine having a toe pad, means to close the pad about the toe of the jacked shoe and to wipe the leather upwardly thereon, wiper jaws and means for operating the same, and means independent of the pad closing means for causing the withdrawal of the pad while still leaving the wiper jaws in engagement with the leather of the shoe.

15. A lasting machine having in combination the toe head C, the pad $m$ sustained by said head, the wipers $e'$ also sustained by said head, the wiper lever $e^4$ and actuating connections, and the independently operable pad lever $o^{10}$ and actuating connections, said levers and connections also being sustained by said head.

16. A lasting machine having, in combination, a toe head, a toe pad and toe wipers sustained by said head, and means adapted for repeated operation in advance of the action of the toe wipers for closing said pad in and about the toe of the jacked shoe and wiping the leather up and over the sides of the same.

17. A lasting machine having, in combination, end wipers and operating means therefor, an end lasting pad, means independent of the wiper operating means for positioning the pad about the end of a last in juxtaposition to the wipers, and means to move said wipers and pad simultaneously relatively to the last in a path substantially perpendicular to the last bottom.

18. In a lasting machine, the combination of an end embracing pad for engaging the upper about the last end, end wipers above the pad for laying the upper over the last bottom, and means for imparting heat to the pad and wipers to render the upper between them at the end of the last pliable and conformable to the last before being secured thereto.

19. A lasting machine having, in combination, end wipers, an end side-lasting device, separate positioning means for said wipers and device, and means thereafter to move said device in a right line relatively to the last.

20. A lasting machine having, in combination, end wipers, an end lasting pad, separate means to clasp said wipers and pad about the last, and means thereafter to move said pad and last relatively in a direction substantially at right angles to the last bottom.

21. A lasting machine having, in combination, movable end wipers, an end side-lasting device, positioning means therefor, means for moving said device relatively to the last, and means permitting bodily movement of said device in another direction irrespective of said wiper movement during said first movement.

22. A lasting machine having, in combination, movable end wipers, an end lasting pad, means for moving the last and pad relatively in one direction, and means permitting relative bodily movement of said last and pad in another direction irrespective of said wiper movement during the initial relative movement.

23. A lasting machine having, in combination, end wipers, an end lasting pad, means to move said pad vertically to work the upper over the sides of the last end, and means permitting movement of said pad relatively to the wipers and longitudinally of the last bodily during its vertical movement.

24. In a lasting machine, the combination of end wipers, means for advancing said end wipers to engage the upper and lay it over the last bottom, and retracting them, and means arranged for heating the end wipers when retracted from their overlaying position.

25. In a lasting machine, the combination of means for acting on the upper at the end portion of the last including upper heating devices for heating the upper about the sides of the last at the end thereof to render it pliable and conformable to the contour of the last before being fastened thereto, and means transmitting heat to said devices.

26. In a lasting machine, the combination of end wipers, and their operating means, a plate overlapping a portion of said end wipers, and means for heating said plate and thereby the end wipers.

27. In a lasting machine, the combination of end wipers, means for operating said wipers, a part overlying a portion of the end wipers and having a heating chamber, and means for heating said chamber to thereby heat the end wipers.

28. In a lasting machine, the combination of end lasting devices, means permitting said end lasting devices to be rocked into different positions of adjustment, a lever for effecting such rocking adjustment, and means for locking said lever at any point of adjustment against displacement in either direction.

29. In a lasting machine, the combination of end lasting devices, a support for said devices, means for adjusting said support relative to the work, means for locking said support against movement, and a controller for controlling said locking means having an initial movement relative to said adjusting means for unlocking said support.

30. In a lasting machine, end lasting devices, a support for said end lasting devices, means permitting rocking adjustment of said support, a lever for effecting such rocking adjustment, and locking means to prevent rocking movement of said support until initial movement of said lever.

31. In a lasting machine, end wipers, a support therefor, means permitting said support to be tilted into different positions with relation to the work, a lever for effecting tilting movement of said support, and a locking device normally effective to prevent tilting movement of said support and rendered ineffective by movement of said lever.

32. In a lasting machine, end wipers, a support therefor, means permitting said support to be tilted into different positions with relation to the work, a lever for effecting tilting movement of said support, a locking device normally effective to prevent tilting movement of said support, and a trip to render the locking device ineffective upon movement of said lever.

33. In a lasting machine, the combination of end lasting devices, a support for said devices mounted for longitudinal and transverse tilting movements, lever actuated means for effecting longitudinal and transverse tilting movements independently, and means for locking the support from such tilting movements rendered ineffective by movement of the lever means.

34. In a lasting machine, end wipers, a support for said wipers mounted for tilting movement, a lever for effecting the tilting movement of the support, a segment and a pair of locking fingers adapted to engage therewith to lock the support from tilting movement, and means for freeing the locking action of the fingers upon movement of the lever in either direction.

35. In a lasting machine, the combination of an end pad, means for advancing and closing the pad about the end of a last, and non-elastic means connecting the pad advancing means at opposite sides of the machine for permitting movement of the ends of the pad different amounts in securing like closing pressure at the opposite sides of a last.

36. In a lasting machine, the combination of an end pad, means for advancing and closing the pad about the end of a last, and non-elastic means automatically movable transversely of the machine to equalize the closing pressure of the two ends of the pad.

37. In a lasting machine, the combination of an end pad, means for closing the ends of the pad about the last, and unitary means acting by bodily transverse movement to equalize the closing pressure of the two ends of the pad.

38. In a lasting machine, the combination of an end pad movable longitudinally of the machine, means acting as the pad is moved relative to the shoe for moving the ends of the pad toward each other, and unitary means acting positively and automatically as the ends of the pad are moved toward each other to equalize their pressure against the sides of the last.

39. In a lasting machine, an end pad, means for advancing the pad ends longitudinally of the shoe, and positively acting means automatically controlled in its position transversely of the machine by the work to effect equal pad end closing pressure against the two sides of an unsymmetrical shoe.

40. A lasting machine having, in combination, an end embracing pad provided with pivoted end supports, supporting means for said end supports mounted to permit said end supports to be moved toward and from each other, and means mounted for self adjustment transversely of the machine to move said supporting means for effecting equal pressure at the two sides of a last.

41. A lasting machine comprising, in combination, an end pad, slide bars, and pad end supports carried by the slide bars, supports for the slide bars, means for advancing the slide bars, and unitary means so arranged with relation to the other elements as to act automatically to equalize the end pressure of the pad at the two sides of the last.

42. A lasting machine comprising, in combination, an end embracing pad, slide bars movable endwise to advance the pad ends and movable angularly to close the pad ends against the sides of the last, and an element movable transversely with relation to the slide bars to equalize the pad closing pressure of the said slide bars at the two sides of the last.

43. In a lasting machine, the combination of an end embracing pad, slide bars movable endwise to advance the pad ends and angularly to close the pad ends against the sides of the last, actuating means comprising a member having a pin and slot connection with the ends of the slide bars, and an equalizer to insure like closing pressure of the pad at the two sides of the last.

44. In a lasting machine, the combination of an end embracing pad, slide bars movable endwise to advance the pad ends and angularly to close the pad ends against the sides of the last, pivoted guiding devices in which the slide bars are mounted, and means for causing turning movements of the pivoted guiding devices amounts determined by the contour of the last to equalize pressures on each side thereof.

45. The combination of a movable end pad, a link, connections between the link and pad for actuating the latter, and a rod arranged transversely with relation to the pad and operative with said connections to insure equal pressure of the pad on each side of the last.

46. In a lasting machine, the combination of a heating chamber, end wipers, and means for moving the wipers into heating relation with the heating chamber and advancing the wipers to act upon the upper and lay it over a shoe sole while the wipers are in a heated condition.

47. In a lasting machine, the combination of end wipers for laying an upper over a shoe sole, a plate having a heating chamber, and means for moving the wipers into inactive position close to said heating chamber and for moving the wipers for acting upon the upper while in a heated condition.

In testimony whereof, I have signed my name to this specification, in the presence of two subscribing witnesses.

MERTON D. PHELAN.

Witnesses:
 THOMAS B. BOOTH,
 ROBERT H. KAMMLER.